US 010247442 B2

(12) United States Patent
Brooks

(10) Patent No.: US 10,247,442 B2
(45) Date of Patent: Apr. 2, 2019

(54) AIR FILTER DIMENSION ADAPTER

(71) Applicant: Steven Lenard Brooks, Holiday, FL (US)

(72) Inventor: Steven Lenard Brooks, Holiday, FL (US)

(*) Notice: Subject to any disclaimer, the term of this patent is extended or adjusted under 35 U.S.C. 154(b) by 104 days.

(21) Appl. No.: 15/388,061

(22) Filed: Dec. 22, 2016

(65) Prior Publication Data
US 2018/0180321 A1 Jun. 28, 2018

(51) Int. Cl.
*B01D 46/00* (2006.01)
*B01D 46/10* (2006.01)
*F24F 13/28* (2006.01)

(52) U.S. Cl.
CPC .......... *F24F 13/28* (2013.01); *B01D 46/0005* (2013.01); *B01D 46/10* (2013.01); *B01D 2275/203* (2013.01)

(58) Field of Classification Search
CPC ............ B01D 46/0002; B01D 46/0005; B01D 46/0006; B01D 2265/05; B01D 2265/06; B01D 2275/203; B01D 2275/206; B01D 2279/50; F24F 3/1603; F24F 3/1614; F24F 13/28
USPC .......................................................... 55/496
See application file for complete search history.

(56) References Cited

U.S. PATENT DOCUMENTS

| 3,076,303 A * | 2/1963 | Durgeloh | B01D 46/10 160/380 |
| 5,772,713 A * | 6/1998 | Salinas | B01D 46/0002 210/476 |
| 5,837,022 A * | 11/1998 | Chapman | B01D 46/0006 55/496 |
| 5,849,187 A * | 12/1998 | Plaisier | B01D 29/39 210/445 |
| 6,007,596 A * | 12/1999 | Rosen | B01D 46/0002 55/491 |
| 6,284,011 B1 * | 9/2001 | Chiang | B01D 46/0005 55/471 |
| 6,533,835 B2 * | 3/2003 | Wilson | B01D 46/0002 55/385.1 |
| 6,790,261 B1 * | 9/2004 | Delts | B01D 46/0002 55/496 |
| 2003/0074872 A1 * | 4/2003 | Lawlor, Sr. | B01D 46/001 55/493 |
| 2010/0101197 A1 * | 4/2010 | Livingstone | B01D 46/0006 55/356 |
| 2011/0094198 A1 * | 4/2011 | Pindell | B01D 46/000 55/504 |
| 2017/0241192 A1 * | 8/2017 | Fox | B01D 46/0002 |
| 2017/0284699 A1 * | 10/2017 | Ezequiel | F24F 13/28 |

OTHER PUBLICATIONS

"AC Filter Size Adapter", Thingiverse, Jul. 2014, 4 pages, retrieved from https://www.thingiverse.com/thing:403621 on Jun. 1, 2018. (Year: 2014).*

* cited by examiner

*Primary Examiner* — Jason M Greene

(74) *Attorney, Agent, or Firm* — Dunlap Bennett & Ludwig PLLC; Brendan E. Squire

(57) ABSTRACT

A device that attaches to an air filter to modify the dimensions to allow fitment. The invention allows the use of a standard air filter in a non standard sized return filter grill or air handler.

14 Claims, 3 Drawing Sheets

AIR FILTER DIMENSION ADAPTER

BACKGROUND OF THE INVENTION

The present invention relates to air filters for heating ventilation and air conditioning systems (HVAC) and, more particularly, to apparatus for fitting an air filter to a filter opening.

Air handlers for HVAC systems require that the filters be changed at regular intervals to ensure efficiency and provide a clean air flow. For the homeowner with a conventional sized air filter, the task of replacing the filter and the costs associated are greatly reduced. However, for the homeowner with a system that requires odd size filters, the task is considerably more expensive and performance of the task may be delayed, where the required filter size may not generally be available for purchase at local stores.

As can be seen, there is a need for an improved device that allows for the use of a standard air filter, that may be carried locally, and permit it to be used in a non-standard sized return filter grill or air handler.

SUMMARY OF THE INVENTION

In one aspect of the present invention, an air filter adapter, includes an elongate channel member having a base portion and a pair of upstanding legs extending from the base portion; and a dimensional spacing element, configured to be positioned between the base portion and an edge of an air filter element.

The channel member may be substantially U-shaped channel member, and formed as an extrusion. The spacing element may be formed of one of a foam, a cellulose, a cardboard, a plastic, or a corrugated material. The width of the base portion of the channel member is at least the thickness of the air filter element. In some embodiments, a plurality of rib elements are defined along an interior surface of at least one of the upstanding leg portions. The elongate channel member is configured to clamp along an edge surface of the filter element and adapt a first dimension of the filter element to a filter opening. The air filter adapter may also include a second elongate channel member, configured to clamp along a second edge surface of the filter element and adapt a second dimension of the filter element to the filter opening.

Other aspects of the invention include an air filter adapter. The air filter adapter is formed as an elongate channel member configured to clamp along an edge surface of a filter element and adapt a first dimension of the filter element to a filter opening; and a dimensional spacing element, configured to be positioned between the base portion and the edge surface of the air filter element. A plurality of barbs may extend from an interior surface of a leg of the elongate channel member.

Yet other aspects of the invention include a method of adapting an air filter element to an air filter opening. The method includes providing an elongate channel member configured to clamp along an edge surface of an air filter element; and providing a dimensional spacing element, configured to be positioned between a base portion of the elongate channel member and the edge surface of the air filter element. The elongate channel member and dimensional spacing elements may be provided in a variety of predetermined lengths, alternatively the materials may be provided so that they are cut to length by the user to size the materials for a particular air filter opening space. The method may also include attaching the elongate channel member along a first edge surface of the air filter element. In some instances, the method includes installing the modified filter element in the air filter opening. In yet other embodiments, the method of claim may also include attaching the elongate channel member along a second edge surface of the air filter element.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an apparatus to improve the fit of a filter element within an HVAC system. The apparatus may also be utilized to adapt a standard sized filter element to a non-standard filter opening within the HVAC system.

Figure 1:
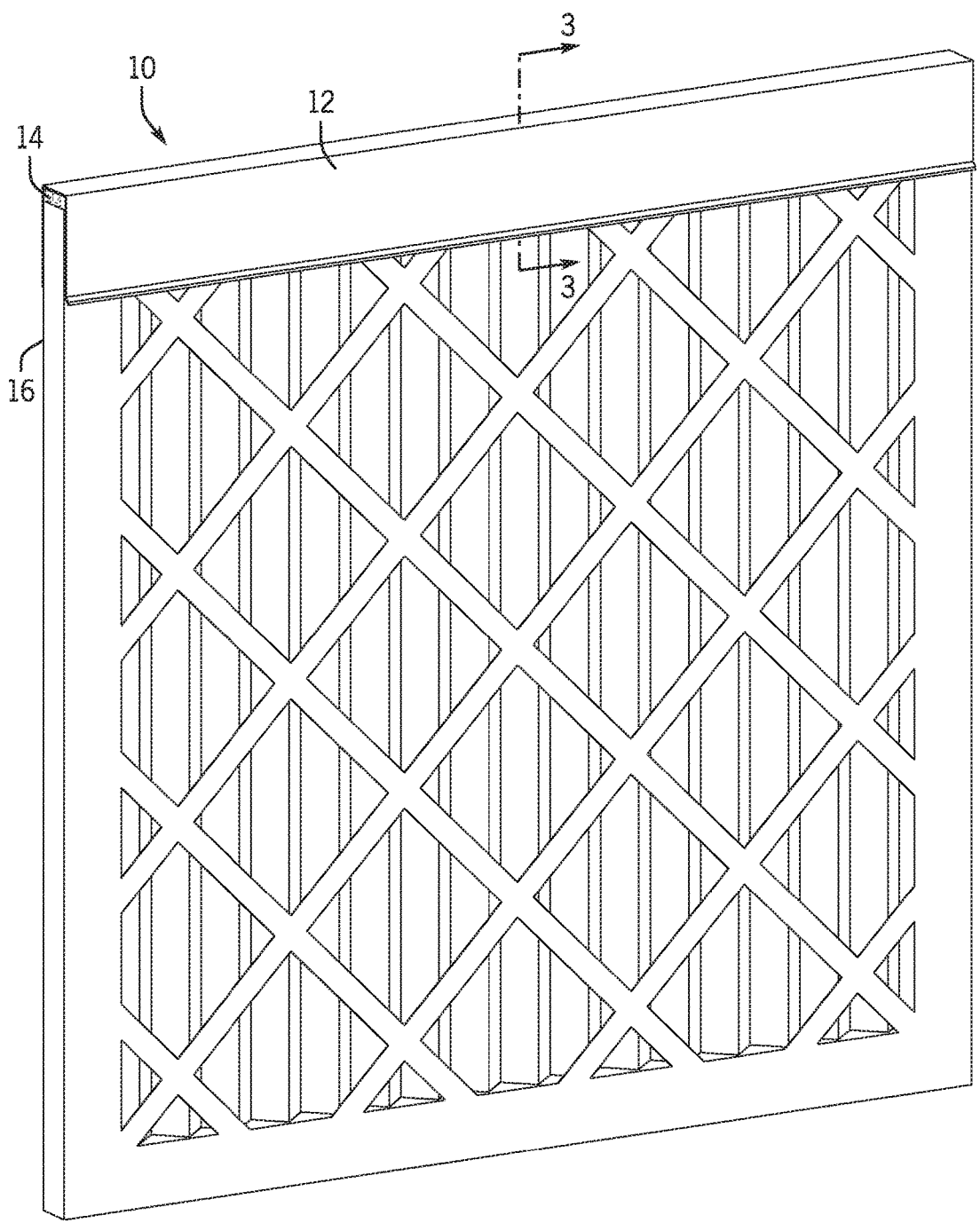
FIG. 1 is a front perspective view of a filter fitter of the present invention in use applied to an air filter.
Figure 2:
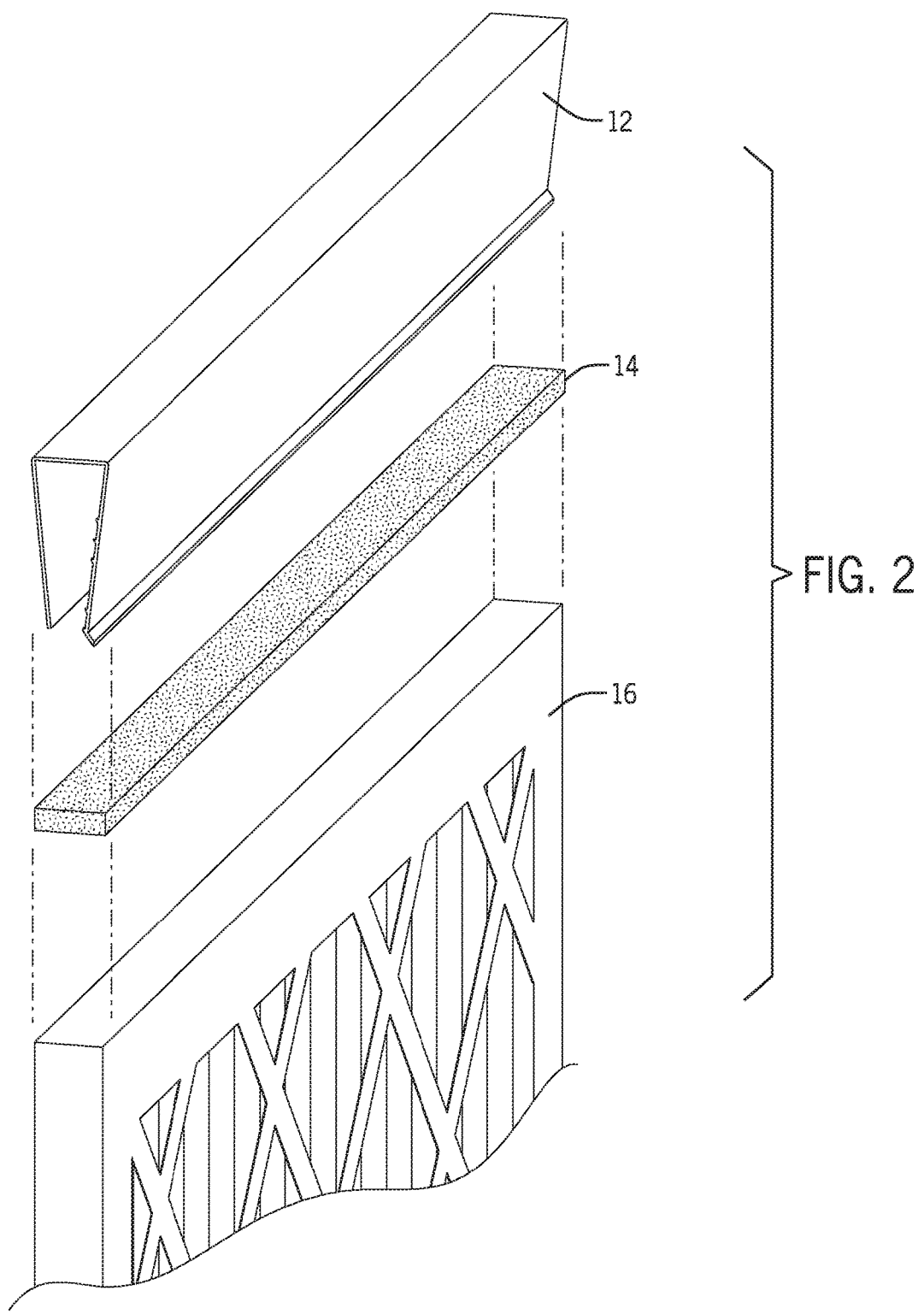
FIG. 2 is an exploded perspective view of a filter fitter applied to an air filter.
Figure 3:
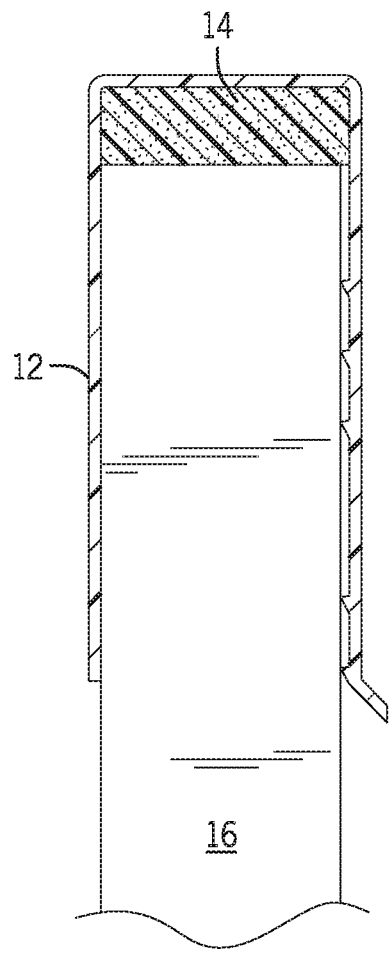
FIG. 3 is a cross-sectional view taken on line 3-3 of FIG. 1.
Figure 4:
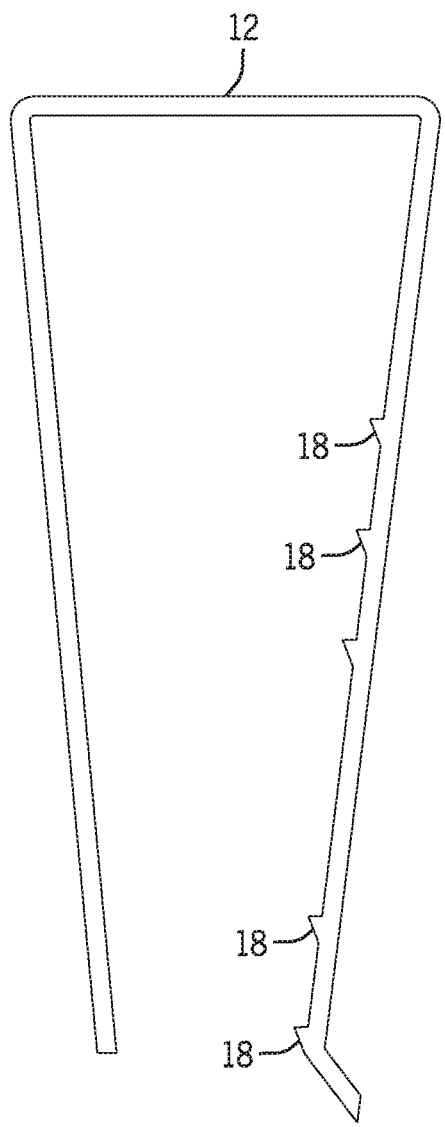
FIG. 4 is a side elevation view of a filter fitter according to aspects of the invention.

As seen in reference to the drawings of FIGS. 1-4, a filter fitter assembly 10 is shown according to aspects of the invention. The filter fitter assembly 10 includes an elongate substantially U-shaped channel member 12 and a dimensional spacing element 14. The channel member 12 is configured to receive the spacing element 14 between the channel member 12 and a side edge of an air filter 16 to provide a dimensional adaptation of the air filter 16 in at least one of its dimensions.

The channel member 12 may be formed as an extrusion, of PVC, aluminum, and the like, having a base portion and a pair of upstanding leg portions extending from the base portion. The base portion is dimensioned to correspond to a thickness of the air filter element 16. For example, when utilized with an air filter element 16 having dimensions of 20"×20"×1", the width of the base portion will be at least 1".

The leg portions are preferably configured such that they converge inwardly between the base portion and a free end of the leg portions. The leg portions are configured to resiliently clamp an end of the filter media 16. More preferably at least one interior surface of the leg portions are provided with one or more barbs 18, which may extend along a longitudinal length of the channel member 12. The barbs 18 are configured to engage with a surface of the filter element 16.

The dimensional spacing element 14, is preferably formed from a foam material, but may alternatively be formed from a cardboard, a cellulose, a plastic, or other suitable material. The dimensional spacing element 14 provides a body between an edge of the filter element 16 and an interior surface of the U-shaped channel member 12 so as to adapt the spacing of the channel member 12 and an edge surface of the filter element 16. The dimensional spacing element 14 may also be formed from one or more spacing elements 14 of various sizes to obtain a desired adaptive spacing between a standard filter dimension and a non-standard filter opening.

Air handlers for HVAC units often require odd size filters which are expensive and or not available at a local store. Adding a filter fitter 10 according to aspects of the invention allows the use of a standard air filter 16, which is carried locally at a home improvement or hardware store, to be used in a non-standard sized return filter grill or air handler. For example attach the filter fitter 10 according to the present invention to a 20"×20" filter 16 and a roughly one inch thick dimensional spacing element 14 to adapt the 20"×20" filter element 16 for use in a 20"×21" air handler or return filter grill.

As will be appreciated, the filter fitter 10 may be utilized on one or more edge surfaces of a filter element 16 to obtain a desired dimensional adaptation of the filter element 16 to the filter holding receptacle of the HVAC air handler.

It should be understood, of course, that the foregoing relates to exemplary embodiments of the invention and that modifications may be made without departing from the spirit and scope of the invention as set forth in the following claims.

What is claimed is:

1. An air filter adapter, comprising:
   an elongate channel member, having a base portion and a pair of upstanding legs extending from the base portion; and
   a dimensional spacing element, configured to be positioned between the upstanding legs and a frame edge of an air filter element.

2. The air filter adapter of claim 1, wherein the upstanding legs define a substantially U-shaped channel extending from a first end to a second end of the base portion.

3. The air filter adapter of claim 2, wherein the spacing element is formed of one of a foam, a cellulose, a cardboard, a plastic, or corrugated material.

4. The air filter adapter of claim 1, wherein a width of the base member is at least the thickness of the frame of the air filter element.

5. The air filter adapter of claim 2, further comprising:
   a plurality of rib elements defined along an interior surface of at least one of the upstanding legs, wherein at least one of the plurality of rib elements engages with an interior edge of the frame.

6. The air filter adapter of claim 5, wherein the elongate channel member is configured to resiliently clamp along an edge surface of the filter element and adapt a first dimension of the filter element to a filter opening.

7. The air filter adapter of claim 6, further comprising:
   a second elongate channel member, configured to clamp along a second edge surface of the filter frame element and adapt a second dimension of the filter frame element to the filter opening.

8. An air filter frame adapter, comprising:
   an elongate channel member configured to resiliently clamp along an edge surface of a filter frame element and adapt a first dimension of the filter frame element to a filter opening; and
   a dimensional spacing element, configured to be removably positioned between the elongate channel member and the edge surface of the air filter frame element.

9. The air filter adapter of claim 8, further comprising:
   a plurality of barbs extending from an interior surface of a leg of the elongate channel member configured to engage an interior edge of the filter frame element.

10. A method of adapting an air filter frame element to an air filter opening, comprising:
    providing an elongate channel member having upstanding legs extending along a longitudinal length of the elongate channel member, the upstanding legs configured to resiliently clamp along an edge surface of an air filter frame element; and
    providing a dimensional spacing element, configured to be positioned between a the upstanding legs of the elongate channel member and the edge surface of the air filter frame element.

11. The method of claim 10, further comprising:
    installing the dimensional spacing element in the elongate channel member; and
    attaching the elongate channel member along a first edge surface of the air filter frame element.

12. The method of claim 11, further comprising:
    installing the modified filter frame element in the air filter opening.

13. The method of claim 10, further comprising:
    attaching the elongate channel member along a second edge surface of the air filter frame element.

14. The method of claim 10, further comprising:
    cutting the elongate channel member and the dimensional spacing element to one of a length or a width of the air filter opening.

* * * * *